Dec. 15, 1931.   J. E. BANCROFT   1,836,058
VEHICLE RESPONSIVE MECHANISM

Filed Aug. 9, 1926

Inventor
James E. Bancroft

By J. J. Murray
Attorney

Patented Dec. 15, 1931

1,836,058

UNITED STATES PATENT OFFICE

JAMES E. BANCROFT, OF DETROIT, MICHIGAN, ASSIGNOR, BY MESNE ASSIGNMENTS, TO DOOR-MOTIVE CORPORATION, OF WORCESTER, MASSACHUSETTS, A CORPORATION OF MASSACHUSETTS

VEHICLE RESPONSIVE MECHANISM

Application filed August 9, 1926. Serial No. 128,136.

This invention relates to a vehicle responsive control device, and more particularly to a mechanism of this general type which is particularly adapted for use in obtaining automatic operation of various mechanisms, such as a door opening device.

It has previously been proposed to control the actuation of door operating mechanisms for garage doors by means of devices mounted in the roadway and arranged to be struck by the wheels of an approaching vehicle. Such prior constructions have usually comprised some sort of a platform over which the vehicle passes, and this platform is yieldably supported by means of pivoted levers or similar devices which are connected to the control device of the door operating mechanism. Constructions of this type have been found unsatisfactory and subject to such difficulties and defects that they are seldom used. They are too delicate and complicated for the conditions under which they operate, and the various levers and bearings frequently become worn or broken. Moreover, these mechanisms are usually installed out of doors where they are exposed to the elements, and great difficulty is caused by snow and ice which accumulates around the various parts.

It is accordingly the main object of my invention to provide a mechanism which is arranged to be mounted in the path of vehicles and other bodies moving temporarily thereover and connected to operate a control device at a distance in a desired manner, and particularly one which is of such simple and rugged construction that it will serve efficiently throughout a long period without attention of any kind.

It is a further object of my invention to provide a vehicle responsive mechanism which may be mounted flush with the surface of a roadway, and which will operate a control device satisfactorily regardless of weather conditions and accumulations of snow or ice.

With these and other objects in view, as will be apparent to those skilled in the art, my invention resides in the combination of parts set forth in the specification and covered by the claims appended hereto.

Referring to the drawings illustrating one embodiment of my invention, and in which like reference numerals indicate like parts:

Figures 1, 2:
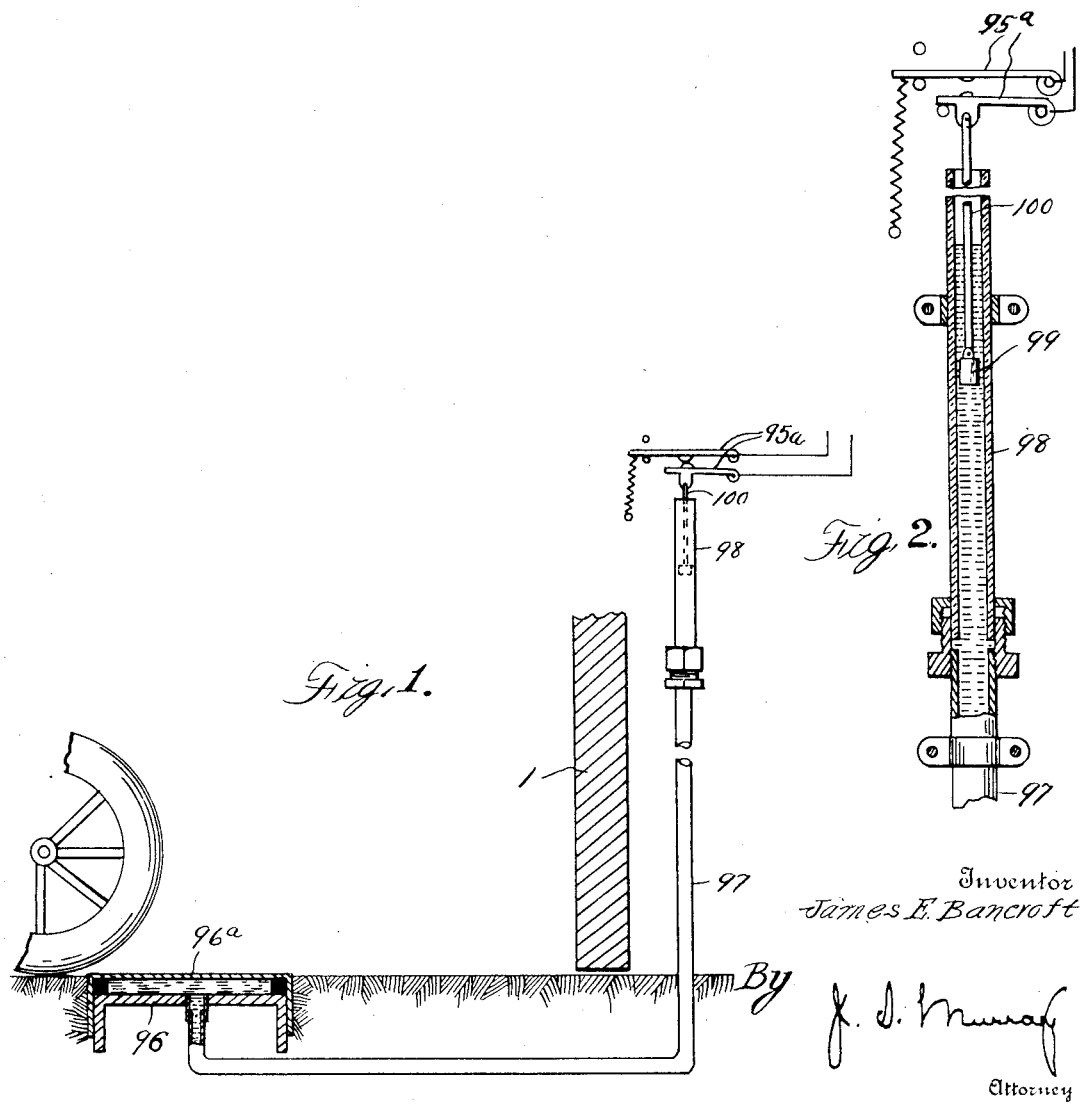
Figure 1 is a vertical sectional view of a liquid container and of means for closing an electric switch by a vehicle-produced pressure rise in said container.
Figure 2 is an enlarged view of a tube and a plunger movable therein to control said switch.

In accordance with my invention, I provide a hydraulic actuating mechanism comprising a member which is arranged to be yieldably supported in the path of vehicles or other moving bodies, and which in response to the weight or movement thereof will serve to transmit an impulse through a body of liquid and thus actuate a desired control device. The yieldable member may be mounted flush with the surface of a roadway, and may be formed as a flexible top wall of a liquid receptacle. The control device may be connected to a piston movable in a cylinder, the cylinder being connected to the liquid receptacle by a liquid filled conduit. The effective area of the yieldable wall is preferably large in comparison with that of the piston, whereby slight movements of the wall will cause magnified movements of the piston. In the preferred construction the piston fits loosely in the cylinder, so that as the liquid expands or contracts in volume as a result of temperature changes it may flow past the piston without causing movement thereof, and yet the piston will be actuated in the event a sudden impulse is imparted to the liquid by contact of a vehicle with the yieldable member. As a specific example of a control device which may be actuated by the hydraulic mechanism, this device may be an electric switch which serves to control the power to a door operating mechanism, a construction which will permit automatic opening of garage doors in response to the approach of a vehicle.

The following description is directed to the particular embodiment illustrated in the drawings.

96 designates a liquid container or hollow member, which is embedded in the drive-way (or the like) exteriorly leading to the door 1, flush with the surface of such drive-way, and which is elongated transversely to the direction of travel through the door-way. The top wall of said container is formed by a plate 96a of sheet metal or the like which is sufficiently flexible to yield slightly under pressure applied by the wheels of a vehicle traveling across said plate. The pressure applied to the liquid contents of the container 96, when its top plate is thus deflected, is transmitted through a pipe or conduit 97 leading from said container to a substantially vertical tube or cylinder 98 mounted at any desired point within the building to which the door-way gives access. As shown in the drawings the container 96, the pipe 97, and the cylinder 98 are filled with liquid. A plunger or piston 99 is suspended by a stem 100 within said tube, and has a sufficient clearance from the tube wall to allow a gradual flow of the liquid in said tube past said plunger without consequent displacement of the latter. The stem 100 is carried, at its upper end by one of the contacts of the switch 95a, the arrangement being such that a slight upward actuation of said plunger will effect a closing of said switch.

Preferably the vertical dimension of the liquid chamber in the container 96 is quite small as compared to the width and length of said container.

Furthermore, the effective area of the wall plate 96a is large compared to that of the piston 99, so that a slight deflection of the plate will cause a much larger movement of the piston.

What I claim is:

1. A vehicle responsive mechanism comprising a sealed receptacle mounted in a pavement and having an extensive and slightly flexible flat upper wall substantially flush with the surface of the pavement, a pipe connected to the receptacle, said pipe and receptacle being filled with liquid which is arranged to exert hydraulic pressure on the lower side of said upper wall, a control device, and means to actuate the control device in response to rapid movements of the liquid in the pipe, said means being unresponsive to slow movements of the liquid.

2. A vehicle responsive mechanism comprising a sealed receptacle mounted in a pavement and having an extensive and slightly flexible flat upper wall substantially flush with the surface of the pavement in the path of vehicle wheels, an electric switch, a cylinder, a pipe connecting the cylinder with the receptacle, a piston mounted within the cylinder, and means connecting the piston with the switch, the cylinder, pipe and receptacle being filled with liquid through which movements of the flexible wall may be transmitted to the piston for actuating the switch.

3. A vehicle responsive mechanism comprising a sealed receptacle providing an extensive surface adapted to be arranged flush with the surface of a pavement in the path of a vehicle wheel, said receptacle having a wall which is only slightly flexible under the weight of the vehicle, a control device, a hydraulic motor connected to said device and having a member movable by impulses in a liquid, and a pipe connecting said receptacle and motor, all of which contain a body of liquid so that an impulse imparted by the vehicle wheel to the liquid in the receptacle is transmitted directly to actuate the motor and said control device.

4. A vehicle responsive mechanism comprising a sealed receptacle providing an extensive surface adapted to be arranged flush with the surface of a pavement in the path of a vehicle wheel, said receptacle having a wall which is only slightly flexible under the weight of the vehicle, a control device, a hydraulic motor connected to said device and having a member movable by impulses in a liquid, and a pipe connecting said receptacle and motor, all of which contain a body of liquid so that an impulse imparted by the vehicle wheel to the liquid in the receptacle is transmitted directly to actuate the motor and said control device, said motor having a by-pass around the movable member whereby a slow movement of the liquid will not operate the control device, while a rapid impulse therein will operate the same.

5. A vehicle responsive mechanism comprising a sealed receptacle mounted in a pavement and having an extensive and slightly flexible flat upper wall substantially flush with the surface of the pavement in the path of vehicle wheels, an electric switch, a cylinder having a substantially vertical axis, a pipe connecting the lower end of the cylinder with the receptacle, a piston mounted within the cylinder, and means connecting the piston with the switch, the cylinder, pipe and receptacle being filled with liquid to a level above the lower surface of the piston and the cylinder being mounted higher than the receptacle so as to provide a hydraulic pressure against the upper wall thereof, the cylinder and piston providing a by-pass so that slow liquid movement will pass the piston and not operate the switch, while rapid liquid movement will operate the switch.

6. A vehicle responsive mechanism comprising a sealed receptacle mounted in a pavement and having an extensive and slightly flexible flat wall which is deformable by the weight of a vehicle wheel, an electric switch, a cylinder having a substantially vertical axis, a pipe connecting the lower end of the cylinder with the receptacle, a piston mounted within the cylinder and fitting the cylinder loosely, and means connecting the piston with the switch, the cylinder, pipe and receptacle being filled with liquid to a level above the lower surface of the piston and the cylinder being mounted higher than the receptacle so as to provide hydraulic pressure against the walls thereof.

In testimony whereof I sign this specification.

JAMES E. BANCROFT.

CERTIFICATE OF CORRECTION.

Patent No. 1,836,058.  Granted December 15, 1931, to

JAMES E. BANCROFT.

It is hereby certified that error appears in the printed specification of the above numbered patent requiring correction as follows: Page 2. after line 38, insert following the paragraph:

It will now be clear that whenever a vehicle wheel contacts with the plate 96a, this plate will deflect slightly and cause a sudden upward surge of the liquid in the cylinder 98, thereby moving the piston 99 upwardly and closing switch 95a momentarily. This switch may be arranged to actuate any suitable apparatus, such as a mechanism for opening the door 1. The device is very simple and rugged, and is not affected by snow and ice accumulations. Temperature changes will merely vary the liquid level in the cylinder without changing the operation in any respect.

and that the said Letters Patent should be read with this correction therein that the same may conform to the record of the case in the Patent Office.

Signed and sealed this 16th day of February, A. D. 1932.

(Seal)

M. J. Moore,
Acting Commissioner of Patents.